United States Patent
Moore, Jr. et al.

(10) Patent No.: US 8,150,541 B2
(45) Date of Patent: Apr. 3, 2012

(54) METHODS AND APPARATUS TO MODIFY A RECIPE PROCESS FLOW ASSOCIATED WITH A PROCESS CONTROL SYSTEM DURING RECIPE EXECUTION

(75) Inventors: James Henry Moore, Jr., Georgetown, TX (US); Nathan William Pettus, Georgetown, TX (US); William George Irwin, Austin, TX (US); Tusar Nanda, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 363 days.

(21) Appl. No.: 11/939,304

(22) Filed: Nov. 13, 2007

(65) Prior Publication Data
US 2009/0125126 A1    May 14, 2009

(51) Int. Cl.
*G06F 19/00*    (2011.01)
(52) U.S. Cl. .................................................. 700/103
(58) Field of Classification Search .............. 700/19, 700/20, 31, 103; 717/136, 151, 168; 718/105
See application file for complete search history.

(56) References Cited

U.S. PATENT DOCUMENTS

| | | | |
|---|---|---|---|
| 4,500,687 A | 2/1985 | Wolfe | |
| 4,570,217 A | 2/1986 | Allen et al. | |
| 4,786,182 A | 11/1988 | Larsen | |
| 4,885,677 A | 12/1989 | Heilman et al. | |
| 5,058,043 A | 10/1991 | Skeirik | |
| 5,113,350 A | 5/1992 | Sargent | |
| 5,355,320 A | 10/1994 | Erjavic et al. | |
| 5,499,188 A | 3/1996 | Kline, Jr. et al. | |
| 5,576,946 A | 11/1996 | Bender et al. | |
| 5,631,825 A | 5/1997 | van Weele et al. | |
| 5,644,686 A | 7/1997 | Hekmatpour | |
| 5,689,415 A | 11/1997 | Calotychos et al. | |
| 5,696,885 A | 12/1997 | Hekmatpour | |
| 5,719,559 A | 2/1998 | Talbott et al. | |
| 5,720,007 A | 2/1998 | Hekmatpour | |
| 5,806,056 A | 9/1998 | Hekmatpour | |
| 5,822,745 A | 10/1998 | Hekmatpour | |

(Continued)

FOREIGN PATENT DOCUMENTS

DE    10 2006 056143 A1    10/2007

(Continued)

OTHER PUBLICATIONS

Stallman et al.; "Debugging with The GNU Source-Level Debugger"; Jan. 1994; Edition 4.12, pp. 1-15.*

(Continued)

*Primary Examiner* — Albert Decady
*Assistant Examiner* — Chad Rapp
(74) *Attorney, Agent, or Firm* — Hanley, Flight and Zimmerman, LLC

(57) ABSTRACT

Example methods and apparatus to modify a recipe process flow during recipe execution are disclosed. A disclosed example method involves executing a recipe, and before completion of execution of the recipe, receiving process flow change information indicative of a modification to a process flow of the recipe. Process flow rules are then retrieved from a process flow rules data structure. The recipe process flow is modified based on the process flow change information in response to determining that at least one requested change indicated by the process flow change information does not violate one of the process flow rules.

25 Claims, 6 Drawing Sheets

U.S. PATENT DOCUMENTS

| | | | |
|---|---|---|---|
| 5,870,768 A | | 2/1999 | Hekmatpour |
| 5,970,243 A * | | 10/1999 | Klein et al. .................. 717/113 |
| 5,990,906 A | | 11/1999 | Hudson et al. |
| 6,000,830 A | | 12/1999 | Asano et al. |
| 6,173,418 B1 | | 1/2001 | Fujino et al. |
| 6,289,252 B1 | | 9/2001 | Wilson et al. |
| 6,292,708 B1 | | 9/2001 | Allen et al. |
| 6,296,711 B1 | | 10/2001 | Loan et al. |
| 6,385,496 B1 | | 5/2002 | Irwin et al. |
| 6,385,552 B1 | | 5/2002 | Snyder |
| 6,415,246 B1 | | 7/2002 | Snyder |
| 6,438,436 B1 | | 8/2002 | Hohkibara et al. |
| 6,488,037 B1 | | 12/2002 | Guldi |
| 6,507,765 B1 | | 1/2003 | Hopkins et al. |
| 6,522,934 B1 | | 2/2003 | Irwin et al. |
| 6,535,122 B1 | | 3/2003 | Bristol |
| 6,542,841 B1 | | 4/2003 | Snyder |
| 6,571,191 B1 | | 5/2003 | York et al. |
| 6,606,527 B2 | | 8/2003 | de Andrade, Jr. et al. |
| 6,615,091 B1 | | 9/2003 | Birchenough et al. |
| 6,647,301 B1 | | 11/2003 | Sederlund et al. |
| 6,684,117 B2 | | 1/2004 | Bacin et al. |
| 6,690,274 B1 | | 2/2004 | Bristol |
| 6,697,690 B2 | | 2/2004 | Scholl et al. |
| 6,732,006 B2 | | 5/2004 | Haanstra et al. |
| 6,791,692 B2 | | 9/2004 | Powell et al. |
| 6,834,370 B1 | | 12/2004 | Brandl et al. |
| 6,853,920 B2 | | 2/2005 | Hsiung et al. |
| 6,901,582 B1 | | 5/2005 | Harrison |
| 6,934,931 B2 | | 8/2005 | Plumer et al. |
| 6,947,917 B1 | | 9/2005 | Mathur et al. |
| 6,952,688 B1 | | 10/2005 | Goldman et al. |
| 6,952,808 B1 | | 10/2005 | Jamieson et al. |
| 6,976,033 B2 | | 12/2005 | Yang et al. |
| 6,983,229 B2 | | 1/2006 | Brown |
| 7,019,829 B2 | | 3/2006 | Powell et al. |
| 7,020,876 B1 | | 3/2006 | Deitz et al. |
| 7,092,771 B2 | | 8/2006 | Retlich et al. |
| 7,149,595 B2 | | 12/2006 | D'Mura |
| 7,171,281 B2 | | 1/2007 | Weber et al. |
| 7,179,664 B2 * | | 2/2007 | Huang et al. .................. 438/14 |
| 7,202,946 B2 | | 4/2007 | Powell et al. |
| 7,310,798 B1 | | 12/2007 | Gunara et al. |
| 7,369,912 B2 | | 5/2008 | Sherrif et al. |
| 7,630,777 B2 | | 12/2009 | Rudnick et al. |
| 7,680,970 B2 | | 3/2010 | Sherriff et al. |
| 7,738,973 B2 | | 6/2010 | McGreevy et al. |
| 7,738,983 B2 | | 6/2010 | Yamaji et al. |
| 7,793,292 B2 | | 9/2010 | Worek et al. |
| 2002/0048213 A1 | | 4/2002 | Wilmer et al. |
| 2002/0055804 A1 | | 5/2002 | Betawar et al. |
| 2002/0076689 A1 | | 6/2002 | Farb et al. |
| 2002/0182870 A1 | | 12/2002 | Matsunaga et al. |
| 2003/0090522 A1 | | 5/2003 | Verhaar |
| 2004/0128003 A1 | | 7/2004 | Frampton et al. |
| 2004/0181294 A1 | | 9/2004 | Deitz et al. |
| 2004/0225384 A1 | | 11/2004 | Onishi et al. |
| 2005/0015168 A1 | | 1/2005 | Cho |
| 2005/0052659 A1 | | 3/2005 | Jacobsen et al. |
| 2005/0177269 A1 | | 8/2005 | Funk |
| 2005/0228523 A1 | | 10/2005 | Heminway et al. |
| 2006/0020362 A1 | | 1/2006 | Morinaga et al. |
| 2006/0020931 A1 | | 1/2006 | Clarke |
| 2006/0074736 A1 | | 4/2006 | Shukla et al. |
| 2006/0089739 A1 | | 4/2006 | Sherriff et al. |
| 2006/0184264 A1 | | 8/2006 | Willis et al. |
| 2006/0191993 A1 | | 8/2006 | Markham et al. |
| 2007/0005170 A1 | | 1/2007 | Schedel |
| 2007/0006123 A1 | | 1/2007 | Matsui |
| 2007/0038889 A1 | | 2/2007 | Wiggins et al. |
| 2007/0050070 A1 | | 3/2007 | Strain et al. |
| 2007/0083282 A1 | | 4/2007 | Lim |
| 2007/0156272 A1 | | 7/2007 | Winstead et al. |
| 2007/0179652 A1 | | 8/2007 | Weigang et al. |
| 2007/0212846 A1 | | 9/2007 | Yokouchi et al. |
| 2007/0233302 A1 | | 10/2007 | Miyazaki et al. |
| 2008/0147207 A1 | | 6/2008 | D'Mura et al. |
| 2008/0172629 A1 | | 7/2008 | Tien et al. |
| 2009/0018692 A1 | | 1/2009 | Yoneda |
| 2009/0082894 A1 | | 3/2009 | Pettus et al. |
| 2009/0125906 A1 | | 5/2009 | Moore, Jr. et al. |
| 2009/0164933 A1 | | 6/2009 | Pederson et al. |

FOREIGN PATENT DOCUMENTS

| | | |
|---|---|---|
| EP | 1833077 A2 | 9/2007 |
| EP | 2 088 491 A1 | 8/2009 |
| GB | 2155662 | 9/1985 |
| GB | 2352060 A | 1/2001 |
| GB | 2364399 A | 1/2002 |
| JP | 2003132093 | 5/2003 |
| JP | 2003263221 | 9/2003 |
| JP | 2005309486 | 11/2005 |
| WO | 2005/058717 A1 | 6/2005 |
| WO | 2007/086027 A1 | 8/2007 |

OTHER PUBLICATIONS

Romero, Espuna, Friedler, Puigjaner. "A New Framework for Batch Process Optimization Using the Flexible Recipe." Industrial & Engineering Chemistry Research. vol. 42, pp. 370-379. 2003.

Deitz, Lorenzo, Stephan. "S88 Redefines Clean In Place." Jun. 2005. www.pharmamanufacturing.com.

Emerson Process Management. "DeltaV Batch Active Step Change." pp. 1-22. May 2004.

Santos. "Understanding S88 Batch Control." Nov. 2001. www.ABJOURNAL.com.

UK Search Report corresponding to Application No. GB0820601.3, dated Feb. 18, 2009, 3 pages.

Chinese Intellectual Property Office issued on Apr. 3, 2009, Text of The First Office Action (English Translation) in Chinese patent application No. 200610138984.5, 20 pages.

"Fisher-Rosemount System Expands the DeltaV System to 30,000 Points with Release 5" Emerson Process Management-News, Jul. 10, 2000.

Rubel, Steve, "Paying Attention to Attention," Mar. 28, 2006, [retrieved from http://www.micropersuasion.com/2006/03/paying_attention.html, accessed on Feb. 11, 2009], 2 pages.

"The Touchstone Manifesto," Touchstone—Are you Paying Attention, [retrieved from http://web.archive.org/web/20060615001506/www.touchstonegadget.com/manifesto/, accessed on Feb. 11, 2009], 2 pages.

Emerson Process Management, "DeltaV Operate," Emerson Process Management Product Data Sheet, Dec. 2006, 9 pages.

The European Patent Office, "Extended European Search Report," European application No. EP 08168837.6, Oct. 6, 2010, 7 pages.

Olsson, Rasmus, "Batch Control and Diagnosis," Department of Automatic Control, Lund Institute of Technology, Jun. 2005, 248 pages.

* cited by examiner

METHODS AND APPARATUS TO MODIFY A RECIPE PROCESS FLOW ASSOCIATED WITH A PROCESS CONTROL SYSTEM DURING RECIPE EXECUTION

FIELD OF THE DISCLOSURE

The present disclosure relates generally to process control systems and, more particularly, to methods and apparatus to modify a recipe process flow associated with a process control system during recipe execution.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the busses and/or other communication links communicatively coupling the field devices.

Process control systems are often configured to perform processes in accordance with batch recipes to produce products. Product designers or engineers prepare recipes during a design time and store the recipes to be subsequently used a plurality of times by a process control system. A recipe typically includes a combination of unit procedures, operations, and phases, all of which include instructions to control process equipment (e.g., tanks, vats, mixers, boilers, evaporators, pumps, valves, etc.) to transfer, mix, etc. ingredients in a process control system to generate a product.

In a typical scenario, a process control system executes the recipe from start to finish to produce a desired product. However, in some cases, a need arises to depart from the normal process flow of a recipe due to, for example, an error in an ingredient, a need to refine a product, an external or environmental factor (e.g., temperature, humidity, etc.) that adversely affects certain operations, etc. Recipes are often intended to execute from start to finish without interruption or modification of the recipe. Thus, there are currently no easy methods by which a recipe can be modified once its execution has begun. If an error has occurred in a process during execution of a recipe for whatever reason or if modification of the recipe is desired after execution has begun, costly ingredients that have been partially processed may have to be scrapped to redesign the recipe during a design time and followed by a restart of the recipe. One traditional method of modifying a recipe during its execution requires an experienced operator or group of operators working together to manually shutdown certain process steps of the recipe, remove or circumvent unwanted process steps from the recipe, and insert desired process steps while ensuring that none of the modifications violate company standard process flow rules and/or industry standard process flow rules. Such a manual process is tedious, costly, and time consuming and prone to error because it requires significant expertise on the part of operator(s) to ensure that product quality is not adversely affected and/or that safe operating conditions are maintained.

SUMMARY

Example apparatus and methods to modify a recipe process flow associated with a process control system during recipe execution are described. In accordance with one described example, a method involves executing a recipe, and before completion of execution of the recipe, receiving process flow change information indicative of a modification to a process flow of the recipe. Process flow rules are then retrieved from a process flow rules data structure. The recipe process flow is modified based on the process flow change information in response to determining that at least one requested change indicated by the process flow change information does not violate one of the process flow rules.

In accordance with another described example, an apparatus includes a user input interface to receive process flow change information indicative of a modification to a process flow of a recipe before completion of execution of the recipe. In addition, the example apparatus includes a rules compliance verifier to determine whether at least one requested change indicated by the process flow change information violates at least one of a plurality of process flow rules in a process flow rules data structure. The example apparatus also includes a process step activator to modify the recipe process flow based on the process flow change information in response to determining that at least one requested change indicated by the process flow change information does not violate one of the process flow rules.

DETAILED DESCRIPTION

Figure 1:
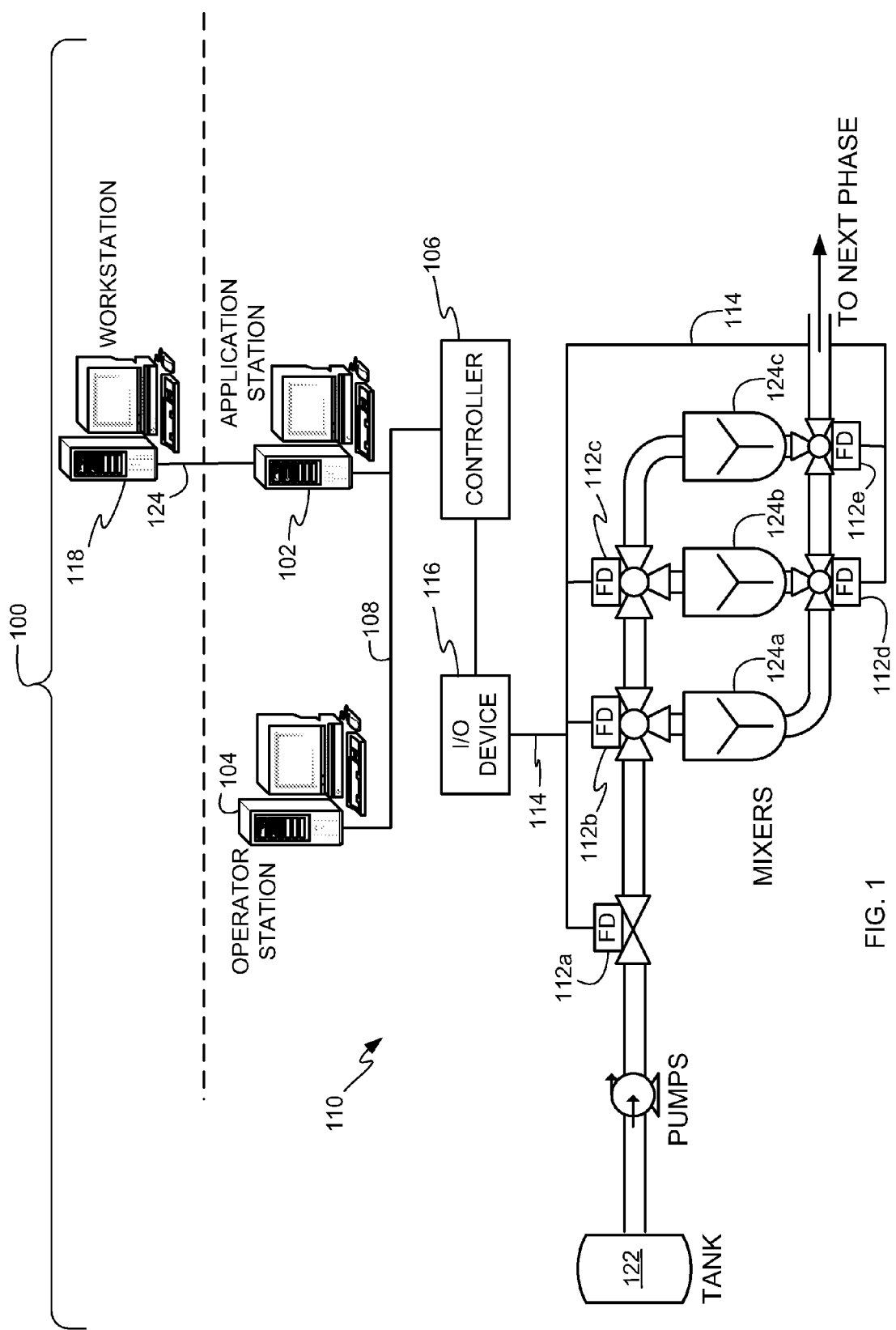
FIG. 1 is a block diagram illustrating an example enterprise in which the example methods and apparatus described herein may be implemented.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

The methods and apparatus described herein can be used to dynamically modify recipe process flows while the recipes are being executed by process control systems. While executing a recipe (e.g., a batch, a procedure, etc.) a problem or other situation may arise that an operator may wish to correct by modifying the process flow of the currently active or running batch recipe. The identified problem or situation can be caused by factors external to the process control system (e.g., delivery of the wrong ingredient), incorrect process settings, or merely by a desire to modify the composition of an end product. For example, while running a batch recipe, an operator may determine that one or more process steps in the batch recipe need to be rerun to change the consistency of a mixture. In another example, one or more process steps may need to be skipped because the mixture is further along than usual.

Traditional methods of changing the process flow of a recipe while the recipe is being executed require an operator to put the active recipe into a manual execution mode, select an active step change (ASC) option, identify every process step in the recipe that the operator wishes to remove from an active list, and identify all the process steps that the operator wishes to be active. During this entire process, the operator must recognize that removal of process steps and addition of other process steps cannot violate any process flow rules. Process flow rules can be industry standards or manufacturer standards and are used to ensure safe operations and to promote high-quality process operations. An example standard that defines process flow rules is the S-88 ANSI/ISA-S88.01-1995 Batch Standard. However, other standards for process flow rules may additionally or alternatively be used in connection with the example methods and apparatus described herein.

Using traditional techniques to perform an ASC is a very difficult and complex process that is prone to errors, which could result in costly mistakes (e.g., needing to discard large amounts of wasted product) and loss of time (e.g., the time required to reconfigure a recipe and restart a process). Modifying a recipe during execution is often done at the risk of losing an entire product batch. In addition, modifying the active recipe could also lead to lost time by the operator or operators trying repeatedly to correctly modify the recipe.

Unlike the traditional methods used to modify a recipe during execution that require significant user interaction and expertise, the example methods and apparatus described herein enable users to modify recipes during execution with significantly less user interaction. In particular, the example methods and apparatus described herein provide an automatic ASC process that is cognizant of recipe process steps to be eliminated and added and the process flow rules with which such process flow changes must comply. The process flow rules are arranged and stored in a database to be referenced by the automatic ASC process during a process flow change, thereby eliminating the need for a user to be aware of or remember and apply all of the rules that may be pertinent to a particular recipe modification. In this manner, the methods and apparatus described herein can substantially reduce or eliminate costly mistakes and loss of time by end users of process control systems.

The example methods and apparatus described herein enable users to predefine any number of different process flow change configuration modules for which the users may foresee a need when running their recipes. For example, a user may know that a product (e.g., paint) is prepared differently for different customers by varying the percentage of one or more ingredients. Instead of preparing numerous different recipes for respective customers or instead of performing the laborious and complex process of manually modifying the process flow of a general paint recipe during execution for each customer, a user may instead use the general paint recipe and define different process flow change configuration modules, each corresponding to a respective customer. In this manner, using the example methods and apparatus described herein to implement an ASC, the user may identify the process flow change configuration module to be implemented and select an ASC option to initiate the process flow modification. The example methods and apparatus described herein can then modify the process flow of the recipe in an orderly manner to prevent damage to the product being prepared by controlling deactivation and activation of process steps and ensuring that none of the changes violates process flow rules.

In another example, a user can identify different operations or phases in a process at which it may be desired to skip certain process steps. The user may predefine process flow configuration modules that deactivate process steps to advance a product batch to process steps further along in the recipe.

In yet another example, a user may identify several risk mitigation points in a recipe at which it may be desirable to discard a product batch containing deficiencies or errors to prevent having to carryout the remainder of a recipe that would only lead to wasting further ingredients added to the product batch that would eventually be discarded anyway.

Now turning to FIG. 1, an example enterprise 100 in which the example methods and apparatus described herein may be implemented includes a process control system 110 having an application station 102, an operator station 104, and a controller 106, all of which may be communicatively coupled via a bus or local area network (LAN) 108. The LAN 108 is commonly referred to as an application control network (ACN) and may be implemented using any desired wired or wireless communication medium and protocol. Although one process control system is illustrated, the example enterprise 100 may include any number of distributed process control systems.

The application station 102 may be configured to perform operations associated with one or more software applications such as, for example, process control-related applications and communication applications that enable the application station 102, the operator station 104, and/or the controller 106 to communicate with other devices or systems. The application station 102 may also be configured to execute batch recipes to control the operations of the process control system 110 and/or any other process control system needed to execute the batch recipes. For example, the application station 102 can be provided with a batch recipe processor or application (not shown) that can acquire any necessary controllers (e.g., the controller 106) and/or any other resources (e.g., process equipment, field devices, instrumentation, etc.) to execute recipes. In addition, the application station 102 can perform operations associated with one or more application(s) used to implement the example methods and apparatus described herein to modify a recipe process flow during execution. In some example implementations, the application station 102 and the operator station 104 may be configured to perform the same functions, while in other example implementations the operator station 104 may be primarily configured to display process status and allow minimal, restricted user interaction with the process. The application station 102 and the operator station 104 may be implemented using one or more workstations or any other suitable computer systems or processing systems (e.g., the processor system 510 of FIG. 5) including, for example, single processor personal computers, single or multi-processor workstations, etc.

The controller 106 may be coupled to a plurality of field devices 112 via a digital data bus 114 and an input/output (I/O) device 116. The field devices 112 may be Fieldbus compliant valves, actuators, sensors, etc. Of course, other types of field devices and communication protocols (e.g., Profibus devices and protocol, HART devices and protocol, etc.) could be used instead. Additional I/O devices (similar or identical to the I/O device 116) may be coupled to the controller 106 to enable additional groups of field devices, which may be Fieldbus devices, HART devices, etc., to communicate with the controller 106.

The controller 106 may be, for example, a DeltaV™ controller sold by Emerson Process Management. However, any other controller could be used instead. Further, while only one controller is shown in FIG. 1, additional controllers of any desired type or combination of types could be coupled to the LAN 108. In any case, the controller 106 may perform one or more process control routines that have been generated by a system engineer or other system operator using the application station 102, the operator station 104, or any workstation and which have been downloaded to and instantiated in the controller 106.

The enterprise 100 also includes a workstation 118 that is communicatively coupled to the application station 102 via another LAN 124 and to the operator station 104 and the controller 106 via the application station 102. The workstation 118 may be configured to perform enterprise-level or plant-wide functions. The workstation 118 may be associated with another process control system network (not shown) and configured to perform primarily process control functions, one or more communication functions, etc. In addition, the workstation 118 may be geographically remotely located, in which case the workstation may be communicatively coupled to the LAN 124 via a wide area network (WAN) that is implemented using, for example, a wireless communication link, an Internet-based or other switched packet-based communication network, telephone lines (e.g., digital subscriber lines), or any combination thereof.

In the illustrated example, each of the field devices 112 is coupled to process equipment to control the flow of fluid or material to be processed. In particular, each of the field devices 112 is coupled to a respective valve to control flow from a tank 122 to mixers 124*a-c* and from the mixers 124*a-c* to another process phase. The controller 106 is provided with a recipe or a portion of a recipe, which may be distributed among multiple controllers. A recipe can define a procedure to prepare a particular product (e.g., a paint, a fuel, a pharmaceutical, etc.) and includes, one or more unit procedures, which include one or more operations, each of which includes one or more phases (i.e., process steps). In the illustrated example of FIG. 1, a procedure can define multiple unit procedures to prepare a paint of a particular color. Each unit procedure can define a different mixing phase. For example, a first unit procedure can define a pre-mix procedure used to mix base ingredients (e.g., latex, oil, solvent, etc.), a second unit procedure may be used to mix intermediary ingredients (e.g., a binder, a surfactant, etc.), and another unit procedure may be used to mix colored pigments into the product.

Each unit procedure is implemented using one or more operations, each having one or more phases or process steps. A phase can correspond to particular process equipment (e.g., one of the mixers 124*a-c*). In the illustrated example of FIG. 1, executing an operation may involve using an ingredient addition phase corresponding to the tank 122 and a mixing or agitation phase corresponding to the mixer 124*a*. The addition phase may involve adding an ingredient from the tank 122 to another ingredient already in the mixer 124*a* and controlling the mixer 124*a* to mix the ingredients. After the mixer 124*a* is finished mixing the ingredients, the field devices 112*d-e* can be controlled to allow the mixed compound to flow from the mixer 124*a* to another phase, which may be part of the same or another operation.

Traditionally, recipes are designed at a design time and executed at runtime without an opportunity to modify the recipe in an automated fashion to add, modify, and/or eliminate phases, operations, and/or unit procedures. The methods and apparatus described herein enable operators or other users to modify the process flow of a recipe while the recipe is running without having to stop the recipe, discard the already mixed ingredients, modify the recipe in a design phase, and restart the recipe. For example, an original recipe may include a pre-mix operation to mix an ingredient from the tank 122 with another ingredient in the mixer 124*a* and then dump or transfer the resulting mixture to another phase. If, during operation, an operator or other user wishes to mix another component part in the mixer 124*b*, the operator or other user can use the methods and apparatus described herein to make the desired change while the recipe process is running and effectuate the change so that the running process can perform the additional operation(s) without stopping and restarting the recipe execution from the beginning.

The example methods and apparatus allow substantially all of the recipe modification process to be transparent to the user such that the user need not be aware of special operating conditions or use configurations (e.g., safety rules, quality control rules, etc.) that may prevent particular changes from being made. Instead, the example methods and apparatus enable a user to enter the desired modifications and select an active step change button on a user interface display to initiate an automated recipe modification process that involves comparing the changes to rules to ensure that the requested modifications are valid and do not violate any process flow rules (e.g., the ANSI/ISA S88 Batch Standard rules). In addition, the example methods and apparatus described herein can be used to ensure that the changes for a particular recipe do not interfere with or adversely impact other phases or operations.

The example enterprise 100 is provided to illustrate one type of system within which the example methods and apparatus described in greater detail below may be advantageously employed. However, the example methods and apparatus described herein may, if desired, be advantageously employed in other systems of greater or less complexity than the example enterprise 100 shown in FIG. 1 and/or systems that are used in connection with process control activities, enterprise management activities, communication activities, etc.

Figure 2:
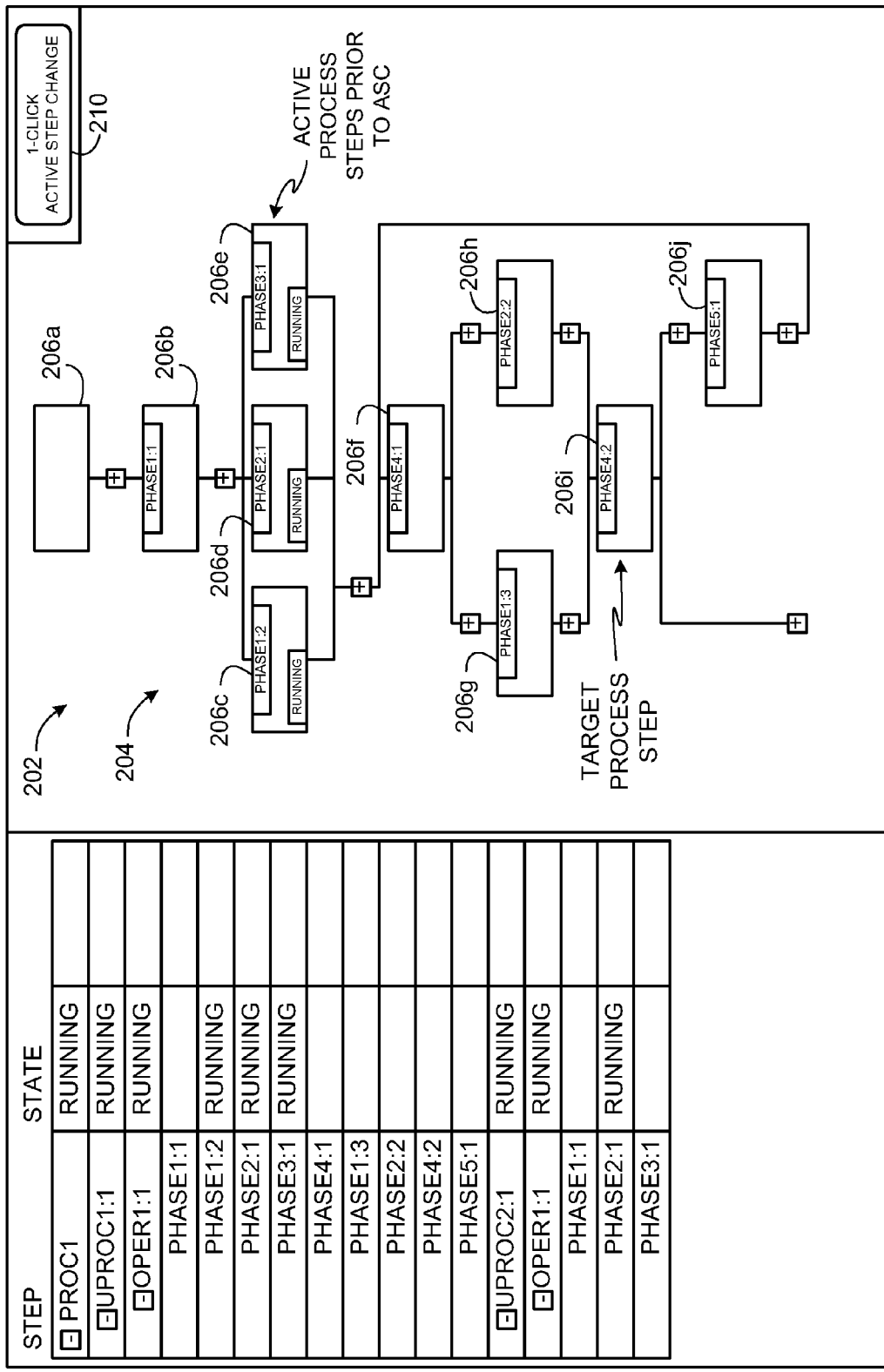
FIG. 2 is a graphical user interface (GUI) of an example procedural function chart (PFC) view interface.

FIG. 2 is a graphical user interface (GUI) of an example procedural function chart (PFC) view interface 200. The example PFC view interface 200 can be displayed by one or more of the application station 102, the operator station 104, and/or the workstation 118 of FIG. 1. The example PFC view interface 200 includes a procedural function chart (PFC) 202 of an example recipe 204. The PFC 202 depicts a recipe having process steps or phases 206*a-j* to be executed in accordance with a pre-configured flow to implement a process. In the illustrated example, the predetermined flow of the recipe 204 involves executing the process step 206*a* followed by the process step 206*b*. After completion of the process step 206*b*, the process steps 206*c-e* execute in parallel, and process step 206*f* executes after completion of the process steps 206*c-e*. After completion of the process step 206*f*, the process steps 206*g* and 206*h* execute in parallel, and the process step 206*i* executes after completion of the process steps 206*g* and 206*h*. After completion of the process step 206*i*, the process step 206*j* is executed. Control then returns to the process step 206*f* after the process step 206*j* is complete, and the process step 206*f* is re-executed. The recipe 204 in the illustrated example is implemented in accordance with process flow rules so that transitions between process steps do not violate any of the process flow rules (e.g., the ANSI/ISA S88 Batch Standard rules).

The example methods and apparatus described herein can be used to modify a process flow during runtime of a recipe so that process steps can be executed out of order relative to a normal or pre-configured flow of a recipe, process steps that are not part of a pre-configured flow of a recipe can be made to execute as part of the recipe, and/or process steps of the pre-configured recipe can be eliminated. In the illustrated example of FIG. 2, the PFC view interface 200 is provided with a one-click active step change (ASC) graphical button (or input control) 210 that can be selected by a user to modify the process flow of the recipe 204 during execution of the recipe 204. To modify the flow of the recipe 204, a user selects a process step change configuration module (e.g., one or more target process steps) to be activated and then selects or clicks on the one-click ASC button 210. In the illustrated example, the process step change configuration module includes the target process step 206i. The example methods and apparatus described herein automatically perform operations described below in response to selection of the one-click ASC button 210 to modify the process flow of the recipe 204 without requiring further interaction by the user. In this manner, the amount of user interaction to perform an active step change to modify the flow of an executing recipe is kept to a substantially minimal amount, which in some cases may involve only selecting a process step change configuration module and clicking on the one-click ASC button 210 and in other cases may involve only clicking on the one-click ASC button 210.

Figure 3:
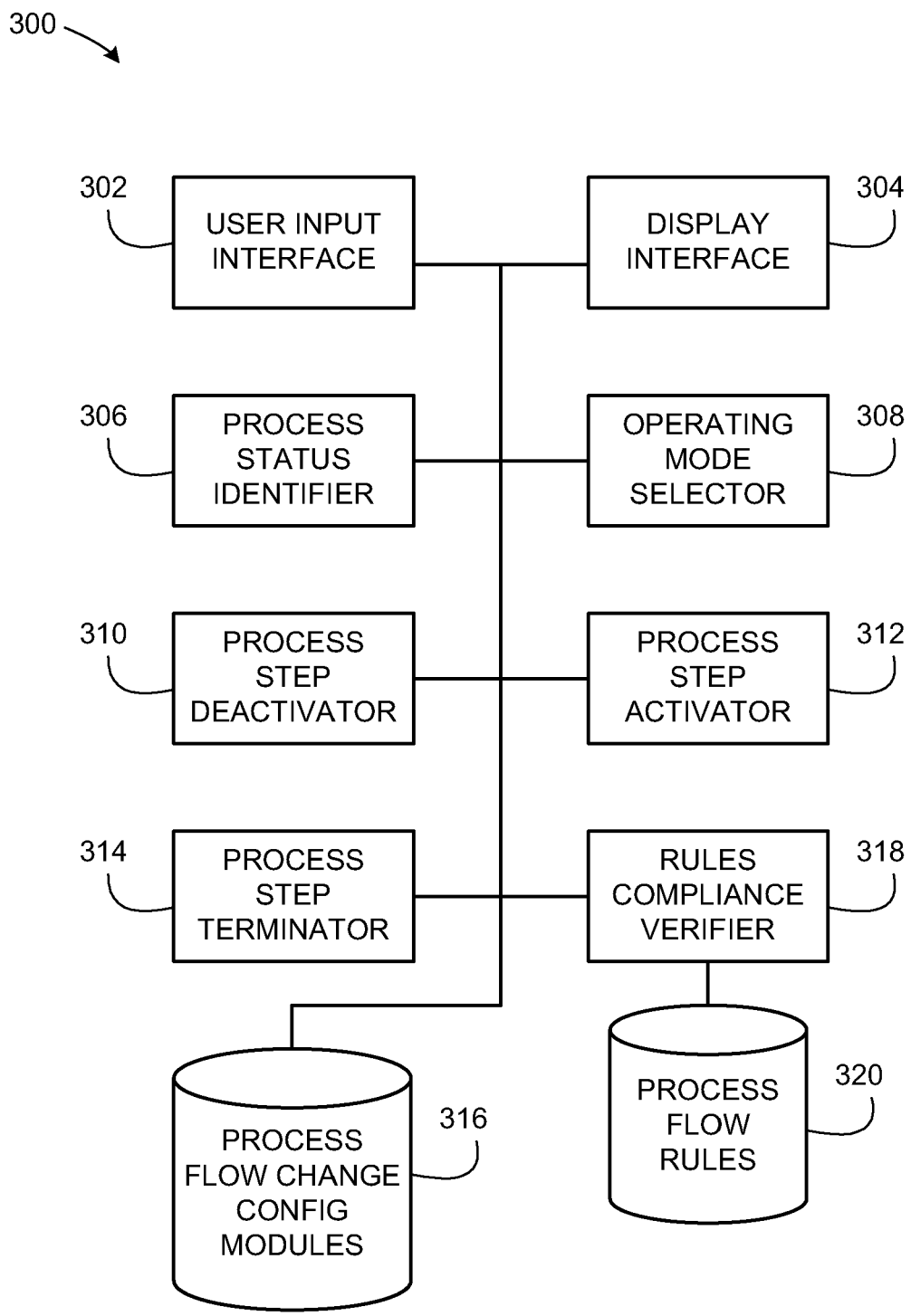
FIG. 3 is a block diagram of an example apparatus that may be used to dynamically modify recipes during their execution.

FIG. 3 is a block diagram of an example apparatus 300 that may be used to dynamically modify recipes during their execution. The example apparatus 300 includes a user input interface 302, a display interface 304, a process status identifier 306, an operating mode selector 308, a process step deactivator 310, a process step activator 312, a process step terminator 314, a process flow change configuration modules data structure 316 (e.g., a database), a rules compliance verifier 318, and a process flow rules data structure 320 (e.g., a database), all of which may be communicatively coupled as shown or in any other suitable manner. The example apparatus 300 may be implemented using any desired combination of hardware, firmware, and/or software. For example, one or more integrated circuits, discrete semiconductor components, or passive electronic components may be used. Additionally or alternatively, some or all of the blocks of the example apparatus 300, or parts thereof, may be implemented using instructions, code, and/or other software and/or firmware, etc. stored on a machine accessible medium that, when executed by, for example, a processor system (e.g., the processor system 510 of FIG. 5) perform the operations represented in the flow diagrams of FIGS. 4A and 4B. Although the example apparatus 300 is described as having one of each block described below, the example apparatus 300 may be provided with two or more of any block described below. In addition, some blocks may be disabled, omitted, or combined with other blocks.

To receive inputs from a user, the example apparatus 300 is provided with the user input interface 302. The user input interface 302 may be implemented using a graphical user interface (GUI) and/or a mechanical (e.g., physical buttons) interface. Referring to the illustrated example of FIG. 2, the user input interface 302 may be implemented using the PFC view interface 200 including the one-click ASC graphical button 210. To display information to a user, the example apparatus 300 is provided with a display interface 304. The display interface 304 may be configured to display the PFC interface 200 and/or any other information related to modifying a recipe.

To identify the status of processes used to implement a recipe, the example apparatus is provided with the process status identifier 306. For example, the process status identifier 306 may be used to determine which process steps or phases are being executed and whether process steps have completed execution. The process status information may be used to determine whether execution of a recipe is in a state that allows for safe removal of process steps and/or whether a wait period is required to permit a recipe transition to a particular state in which the recipe can be modified safely without, for example, adversely impacting product quality.

To change the operating modes of a recipe, the example apparatus 300 is provided with the operating mode selector 308. For example, the operating mode selector 308 can be used to change the operating mode of a recipe from a normal execution mode to a halt mode, thereby causing any subsequent process steps of a recipe not to be executed. Such a change in operating modes can be used to prepare an executing recipe for an active step change.

To deactivate process steps to prevent them from being executed, the example apparatus 300 is provided with the process step deactivator 310. The process step deactivator 310 can be configured to identify process steps that need to be deactivated to implement a process flow change in accordance with a process flow change configuration module selected by a user. To activate process steps that a user desires to be executed but that would not otherwise be executed under a present recipe configuration, the example apparatus 300 is provided with a process step activator 312. The process step activator 312 can be configured to identify process steps that are to be activated to implement a process flow change in accordance with a process flow change configuration module selected by a user.

To terminate a process step to place a recipe in a state that allows the recipe to be modified, the example apparatus 300 is provided with the process step terminator 314. The process step terminator 314 can be configured to receive process status information from the process status identifier 306 to determine whether process steps are still being executed. In addition, the process step terminator 314 can receive information from process flow change configuration modules selected by users to determine which process steps can be prematurely terminated and which process steps must not be terminated prematurely. For example, during a design of a process flow change configuration module, a system engineer may identify that implementing a particular process flow change will occur after execution of another process flow change. If the process step being executed at the time prior to performing a process flow change is one that should not be prematurely terminated (e.g., for safety or product quality reasons), the system engineer can create a setting in the process flow change configuration module instructing that the process step terminator 314 should not prematurely terminate the executing process step and that the example apparatus 300 should instead wait to implement the requested process flow change until the process status identifier 306 determines that the executing process step has ended on its own. In some example implementations, the process step terminator 314 can additionally or alternatively determine whether a process step can be prematurely terminated based on rules stored in the process flow rules database 320.

To store process flow change configuration modules indicative of process flow changes that can be selected by users, the example apparatus 300 is provided with the process flow change configuration modules data structure 316. To determine whether requested process flow changes comply with process flow rules, the example apparatus 300 is provided with the rules compliance verifier 318 and the process flow rules database 320. The process flow rules database 320 is configured to store rules with which process flows changes must comply to ensure safe operation and/or maintaining product quality. For example, the process flow rules may indicate that certain process steps must be executed in parallel or in seriatim. The process flow rules may also indicate that certain process flow modifications cannot be implemented until other currently executing recipes are finished or release equipment (e.g., the tank 122, the mixers 124a-c of FIG. 1, etc.) necessary to execute the proposed modified process flow. Other rules may also be used. The rules compliance verifier 316 is configured to verify that the process flow changes to be made based on a selected process flow change configuration module comply with the rules stored in the process flow rules database 320. If any process flow change violates a rule, the display interface 304 can display an error message.

Figure 4A:
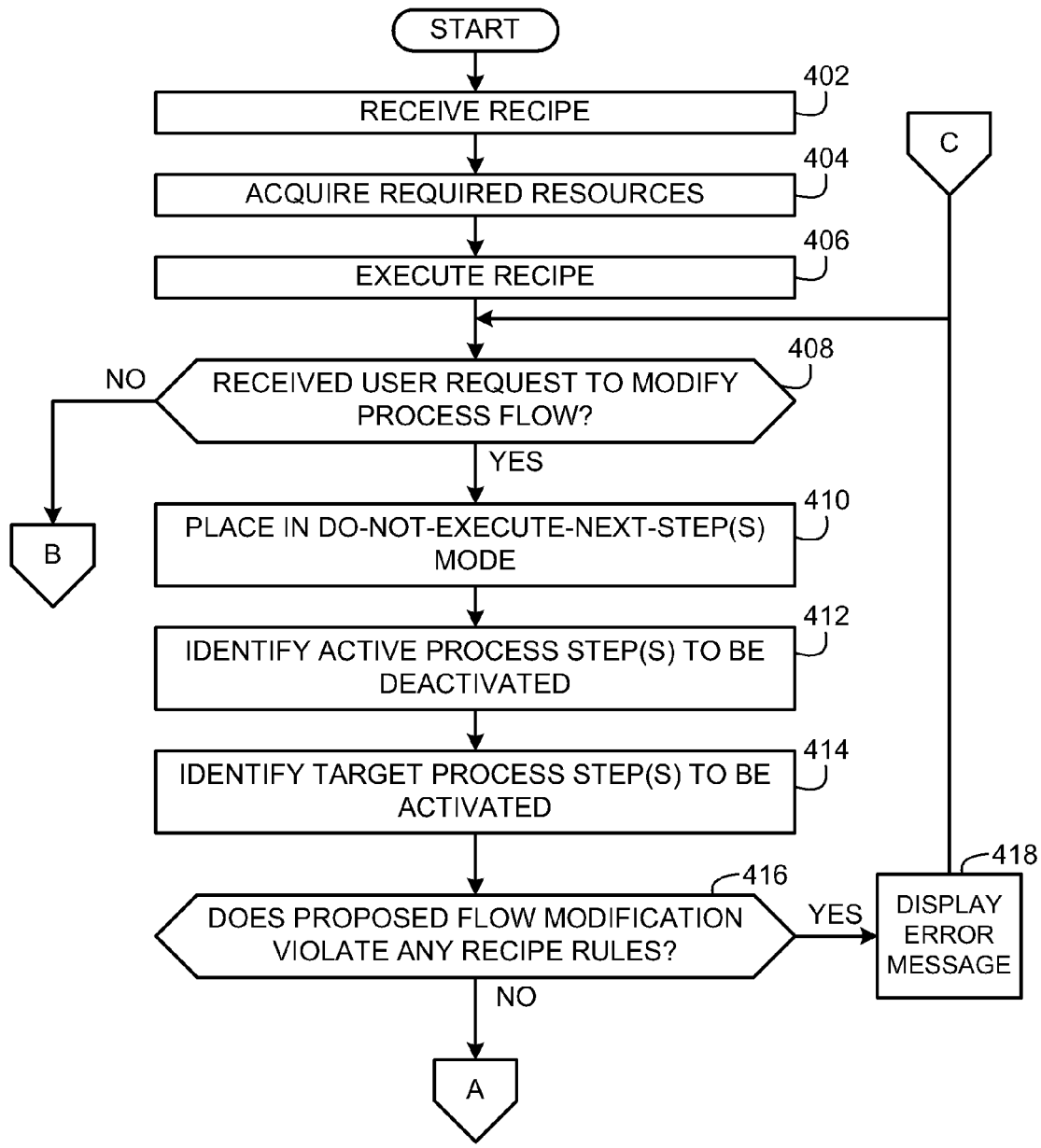
FIGS. 4A and 4B depict a flow diagram of an example method that may be used to implement the example apparatus of FIG. 3 to modify a recipe during execution of the recipe.
Figure 4B:
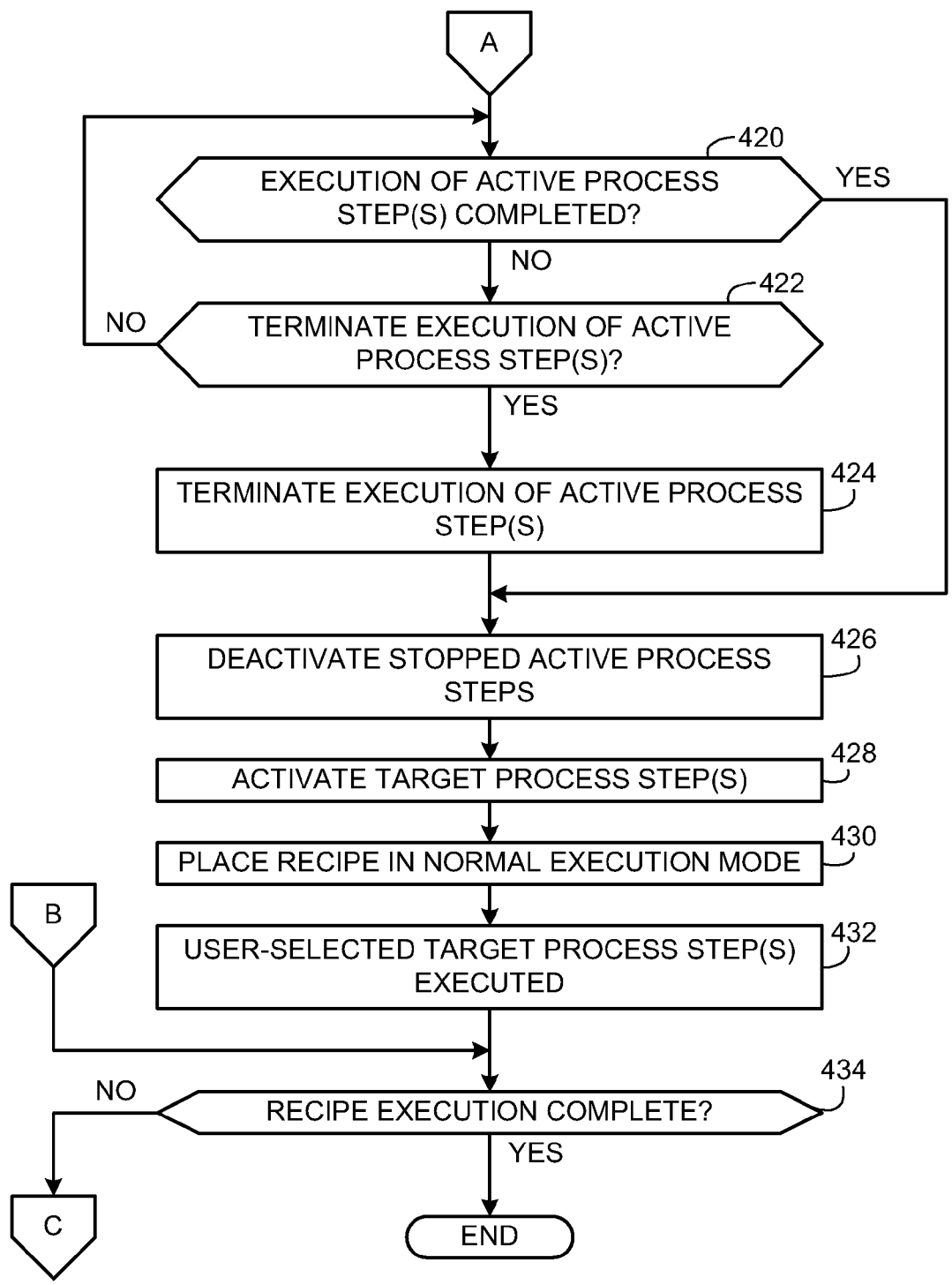

FIGS. 4A and 4B depict a flow diagram of an example method that may be used to implement the example apparatus 300 of FIG. 3 to modify a process flow of a recipe during execution of the recipe. In some example implementations, the example method of FIGS. 4A and 4B may be implemented using machine readable instructions comprising a program for execution by a processor (e.g., the processor 512 shown in the example processor system 510 of FIG. 5). The program may be embodied in software stored on a tangible medium such as a CD-ROM, a floppy disk, a hard drive, a digital versatile disk (DVD), or a memory associated with the processor 512 and/or embodied in firmware and/or dedicated hardware in a well-known manner. Further, although the example program is described with reference to the flow diagram illustrated in FIGS. 4A and 4B, persons of ordinary skill in the art will readily appreciate that many other methods of implementing the example apparatus 300 may alternatively be used. For example, the order of execution of the blocks may be changed, and/or some of the blocks described may be changed, eliminated, or combined.

The example method of FIG. 4 is described in connection with modifying the process flow of the example recipe 204 of FIG. 2. Initially, a batch processor (not shown) receives the recipe 204 (block 402) and acquires resources (e.g., the controller 106, one or more tanks 122, one or more of the mixers 124a-c, one or more of the field devices 112a-e, etc.) required to execute the recipe 204 (block 404). In some example implementations, if the recipe 204 includes multiple unit procedures, the batch processor can acquire resources for only the unit procedure that is about to execute. Upon completion of a unit procedure, the batch processor can release the acquired resources for that unit procedure and acquire other resources for a subsequent unit procedure. The batch processor then executes the recipe 204 (block 406).

During execution of the recipe 204, the user input interface 302 (FIG. 3) determines whether it has received a user request to modify the process flow of the recipe 204 (block 408). In the illustrated example, the user input interface 302 receives a user request to modify the process flow (i.e., a process change request) when a user has selected a process flow change configuration module from the process flow change configuration modules database 316 (FIG. 3) and selects the one-click ASC button 210 of FIG. 2.

When the user input interface 302 receives a user selection to modify the process flow (block 408), the operating mode selector 308 (FIG. 3) places the execution of the recipe 204 in a do-not-execute-next-step(s) mode (block 410). The do-not-execute-next-step(s) mode prevents the batch processor from executing the process steps or phases that sequentially follow the currently executing process step(s) to enable the example apparatus 300 to modify the process flow of the recipe 204 after completion of the currently executing process step(s), but before another process step begins execution. Referring to the illustrated example of FIG. 2, the do-not-execute-next-step(s) mode prevents the process steps 206f from executing after the process steps 206c-e finish executing.

The process step deactivator 310 (FIG. 3) then identifies (or selects) the currently active process step(s) to be deactivated (block 412) based on the process flow change configuration module provided by the user at block 408. In the illustrated example of FIG. 2, the process steps 206c-e are the currently active step(s) to be deactivated because those steps were running when the batch processor received the user selection to modify the process flow at block 408. The process step activator 312 then identifies one or more target process steps to be activated (block 414). In the illustrated example of FIG. 2, the process flow change configuration module indicates that the phase 206i is the target process step to be activated. The rules compliance verifier 318 then determines whether the flow modification proposed in the process flow change configuration module violates any process flow rules (block 416) by, for example, comparing characteristics of the target step 206i and the characteristics of the current active process steps (e.g., the process steps 206c-e) with process flow rules to ensure that the transition does not violate any of the process flow rules. If the rules compliance verifier 318 determines that the proposed flow modification violates one or more process flow rules (block 416), the display interface 304 displays an error message (block 418) and control returns to block 408.

If the proposed flow modification does not violate any of the process flow rules (block 416), the process status identifier 306 (FIG. 3) determines whether the execution of the currently active process steps 206c-e is complete (block 420) (FIG. 4B). If the execution of the currently active process steps 206c-e is not complete (block 420), the process step terminator 314 (FIG. 3) determines whether it should terminate execution of the active process steps 206c-e (block 422). Some process steps may be terminated prematurely without affecting the product being produced, while other process steps should not be terminated prematurely because doing so may have an adverse or unwanted effect on the product or may otherwise be undesirable. Rules indicative of whether a process step can be terminated prematurely may be stored in the process flow change configuration module selected by the user. Additionally or alternatively, the process step terminator 314 can use the rules stored in the process flow rules database 320 to determine whether a step can be terminated.

If the process step terminator 314 determines that it should not terminate the currently active process steps 206c-e (block 422), control returns to block 420 to wait until the active process step(s) 206c-e are complete. Otherwise, if the process step terminator 314 determines that it can terminate the currently active process steps 206c-e (block 422), the process step terminator 314 terminates execution of the active process step(s) 206c-e (block 424). After terminating execution of the active process step(s) 206c-e (block 424) or if the process step terminator 314 determines that execution of the active process steps 206c-e is complete (block 420), the process step deactivator 312 deactivates the completed active steps 206c-e and the intervening steps 206f-h between the process steps 206c-e and the process step 206i (block 426). The process step activator 312 then activates the target process step 206i (block 428), and the operating mode selector 308 places the execution of the recipe 204 in an execution mode (block 430). The batch processor then executes the user-selected target process step 206*i* (block 432). After executing the selected target step 206*i* (block 432) or if the user input interface 302 does not receive a user selection to modify the process flow of the recipe 204 (block 408) (FIG. 4A), the process status identifier 306 determines whether the recipe 204 has completed execution (block 434). If the recipe execution has not completed, control returns to block 408 (FIG. 4A). Otherwise, the example process of FIGS. 4A and 4B is ended.

Figure 5:
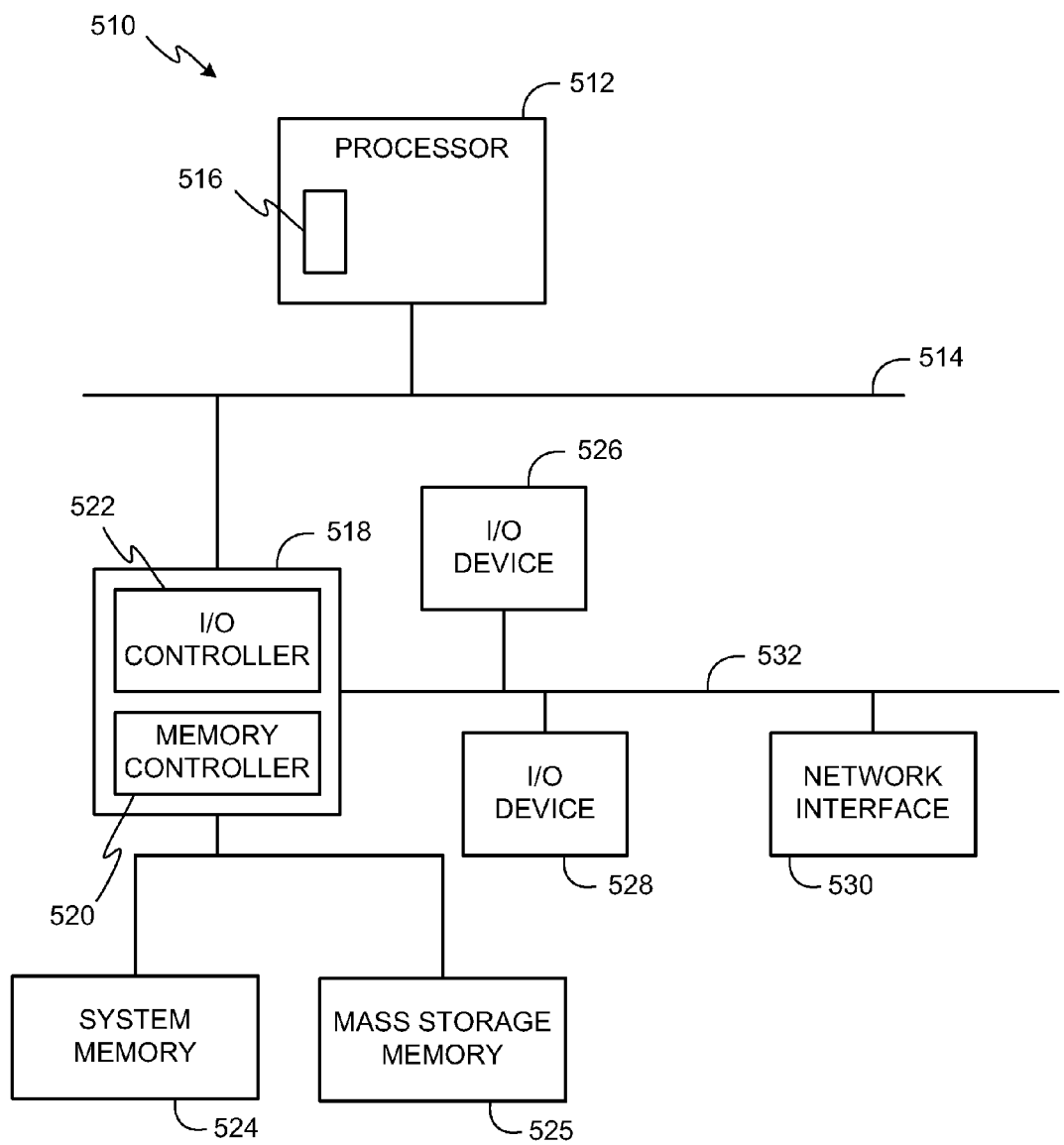
FIG. 5 is a block diagram of an example processor system that may be used to implement the apparatus and methods described herein.

FIG. 5 is a block diagram of an example processor system 510 that may be used to implement the apparatus and methods described herein. As shown in FIG. 5, the processor system 510 includes a processor 512 that is coupled to an interconnection bus 514. The processor 512 includes a register set or register space 516, which is depicted in FIG. 5 as being entirely on-chip, but which could alternatively be located entirely or partially off-chip and directly coupled to the processor 512 via dedicated electrical connections and/or via the interconnection bus 514. The processor 512 may be any suitable processor, processing unit or microprocessor. Although not shown in FIG. 5, the system 510 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and a peripheral input/output (I/O) controller 522. As is well known, a chipset typically provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The peripheral I/O controller 522 performs functions that enable the processor 512 to communicate with peripheral input/output (I/O) devices 526 and 528 and a network interface 530 via a peripheral I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to modify a recipe process flow during recipe execution, the method comprising:
   executing a recipe using a plurality of manufacturing equipment resources; and
   before completion of execution of the recipe:
      receiving process flow change information indicative of a modification to a process flow of the recipe;
      determining, via a processor, whether a process step being executed by one of the manufacturing equipment resources can be stopped prematurely; and
      stopping the executing process step prematurely and modifying a process flow of the recipe based on the process flow change information in response to determining that the executing process step can be stopped prematurely.

2. A method as defined in claim 1, further comprising receiving a process flow change request to modify the process flow based on the process flow change information and modifying the process flow in response to receiving the process flow change request.

3. A method as defined in claim 1, further comprising configuring the execution of the recipe to not execute a subsequent process step prior to modifying the process flow.

4. A method as defined in claim 1, further comprising identifying at least one active process step to be deactivated and at least one target process step to be activated based on the process flow change information.

5. A method as defined in claim 1, further comprising when the executing process step cannot be stopped prematurely, waiting for the executing process step to finish execution prior to modifying the recipe process flow in response to determining that the executing process step cannot be stopped prematurely.

6. A method as defined in claim 1, further comprising determining whether the executing process step can be stopped prematurely based on rules stored in at least one of the process flow change information or a process flow rules data structure.

7. A method as defined in claim 6, wherein the process flow rules data structure is to store at least one of manufacturer-defined process flow rules or industry-defined process flow rules, and wherein the process flow rules are applicable to any other recipe executed by a process control system used to execute the recipe.

8. A method as defined in claim 1, wherein the process flow of the recipe is modified based on the process flow change information in response to a user performing only the procedures of selecting a process step to be activated and selecting a step change user interface button.

9. A method as defined in claim 1, wherein the process flow of the recipe is modified based on the process flow change information in response to a user selecting only a step change user interface button.

10. A method as defined in claim 1, wherein determining whether the process step being executed by one of the manufacturing equipment resources can be stopped prematurely comprises determining whether the process step being executed by one of the manufacturing equipment resources can be stopped prematurely based on maintaining a safe operating condition or based on maintaining a particular quality for a product being produced by the manufacturing equipment resources.

11. An apparatus to modify a recipe process flow during recipe execution, the apparatus comprising:
    a user input interface to receive process flow change information indicative of a modification to a process flow of a recipe before completion of execution of the recipe, the execution of the recipe being carried out using a plurality of manufacturing equipment resources;

a process step terminator to stop an executing process step prematurely in response to determining, via a processor, that the executing process step can be stopped prematurely, the executing process step being executed by one of the manufacturing equipment resources; and a process step activator to modify the process flow based on the process flow change information.

12. An apparatus as defined in claim 11, wherein the user interface is further to receive a process flow change request to modify the process flow based on the process flow change information.

13. An apparatus as defined in claim 11, further comprising a process step deactivator to identify at least one active process step to be deactivated based on the process flow change information, and wherein the process step activator is to identify at least one target process step to be activated based on the process flow change information.

14. An apparatus as defined in claim 11, wherein the process step terminator is further to determine whether a wait period is required to wait for the executing process step to finish execution prior to modifying the recipe process flow.

15. An apparatus as defined in claim 11, wherein the process step terminator is to determine whether the executing process step can be stopped prematurely based on rules stored in at least one of the process flow change information or a process flow rules data structure.

16. An apparatus as defined in claim 15, wherein the process flow rules data structure is to store at least one of manufacturer-defined process flow rules or industry-defined process flow rules, and wherein the process flow rules are applicable to any other recipe executed by a process control system used to execute the recipe.

17. A non-transitory machine accessible medium having instructions stored thereon that, when executed, cause a machine to at least:

execute a recipe using a plurality of manufacturing equipment resources; and before completion of execution of the recipe:
receive process flow change information indicative of a modification to a process flow of the recipe;
determine whether a process step being executed by one of the manufacturing equipment resources can be stopped prematurely; and
stop the executing process step prematurely and modify a process flow of the recipe based on the process flow change information in response to determining that the executing process step can be stopped prematurely.

18. A machine accessible medium as defined in claim 17 having instructions stored thereon that, when executed, cause the machine to receive a process flow change request to modify the process flow based on the process flow change information and modify the process flow in response to receiving the process flow change request.

19. A machine accessible medium as defined in claim 17 having instructions stored thereon that, when executed, cause the machine to configure the execution of the recipe to not execute a subsequent process step prior to modifying the process flow.

20. A machine accessible medium as defined in claim 17 having instructions stored thereon that, when executed, cause the machine to identify at least one active process step to be deactivated and at least one target process step to be activated based on the process flow change information.

21. A machine accessible medium as defined in claim 17 having instructions stored thereon that, when executed, cause the machine to, when the executing process step cannot be stopped prematurely, wait for the executing process step to finish execution prior to modifying the process flow.

22. A machine accessible medium as defined in claim 17 having instructions stored thereon that, when executed, cause the machine to determine whether the executing process step can be stopped prematurely based on rules stored in at least one of the process flow change information or a process flow rules data structure.

23. A machine accessible medium as defined in claim 22, wherein the process flow rules data structure is to store at least one of manufacturer-defined process flow rules or industry-defined process flow rules, and wherein the process flow rules are applicable to any other recipe executed by a process control system used to execute the recipe.

24. A machine accessible medium as defined in claim 17 having instructions stored thereon that, when executed, cause the machine to modify the process flow of the recipe based on the process flow change information in response to a user performing only the procedures of selecting a process step to be activated and selecting a step change user interface button.

25. A machine accessible medium as defined in claim 17 having instructions stored thereon that, when executed, cause the machine to modify the process flow of the recipe based on the process flow change information in response to a user selecting only a step change user interface button.

* * * * *